(12) United States Patent
Li et al.

(10) Patent No.: US 12,382,870 B1
(45) Date of Patent: Aug. 12, 2025

(54) REED BALING AND STACKING DEVICE, METHOD, AND HARVESTER

(71) Applicant: Jiangsu University, Jiangsu (CN)

(72) Inventors: Yaoming Li, Jiangsu (CN); Yuhang Chen, Jiangsu (CN); Kuizhou Ji, Jiangsu (CN); Binbin Ji, Jiangsu (CN); Yanbin Liu, Jiangsu (CN); Zhenwei Liang, Jiangsu (CN); Tuo Du, Jiangsu (CN); Hanhao Wang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/857,822

(22) PCT Filed: Nov. 29, 2023

(86) PCT No.: PCT/CN2023/134910
§ 371 (c)(1),
(2) Date: Oct. 18, 2024

(87) PCT Pub. No.: WO2024/156224
PCT Pub. Date: Aug. 2, 2024

(30) Foreign Application Priority Data

Nov. 1, 2023 (CN) .......................... 202311440800.0

(51) Int. Cl.
*A01F 15/14* (2006.01)
*A01D 59/04* (2006.01)
(Continued)

(52) U.S. Cl.
CPC ............. *A01D 59/04* (2013.01); *A01D 61/00* (2013.01); *A01F 15/005* (2013.01); *A01F 15/145* (2013.01); *A01F 15/146* (2013.01)

(58) Field of Classification Search
CPC ........ A01F 15/005; A01F 15/02; A01F 15/10; A01F 15/145; A01F 15/146; A01D 59/04;
(Continued)

(56) References Cited

U.S. PATENT DOCUMENTS 4,091,943 A * 5/1978 Bay-Schmith .......... B66C 23/54
414/734
6,579,552 B1 * 6/2003 Myhre .................... A01F 15/00
426/454
(Continued)

FOREIGN PATENT DOCUMENTS

CA 2547362 11/2006
CN 201323766 10/2009
(Continued)

OTHER PUBLICATIONS

"International Search Report (Form PCT/ISA/210) of PCT/CN2023/134910," mailed on Jul. 26, 2024, with English translation thereof, pp. 1-6.

(Continued)

*Primary Examiner* — Jimmy T Nguyen
(74) *Attorney, Agent, or Firm* — JCIPRNET

(57) ABSTRACT

The present disclosure provides a reed baling and stacking device, a method, and a harvester. The reed baling and stacking device includes a knotter, a feed box, a stacking mechanism, and a control unit, where the stacking mechanism is located between the knotter and the feed box; the knotter is configured to knot reeds into small bales; the stacking mechanism is configured to stack the small bales of reeds to the feed box vertically or horizontally; the feed box is configured to knot the small bales of reeds into big bale; and the control unit is connected to the feed box and the stacking mechanism. According to the present disclosure, the reeds are knotted into the small bales, the small bales are stacked to the feed box vertically or horizontally, the small bales of reeds are knotted into the big bale, and the big bale is unloaded mechanically.

10 Claims, 9 Drawing Sheets

(51) Int. Cl.
*A01D 61/00* (2006.01)
*A01F 15/00* (2006.01)

(58) Field of Classification Search
CPC ........ A01D 61/00; A01D 57/18; A01D 57/22; A01D 85/005
See application file for complete search history.

(56) References Cited

U.S. PATENT DOCUMENTS

| | | | |
|---|---|---|---|
| 2001/0006023 | A1 | 7/2001 | Brown, Jr. |
| 2013/0014482 | A1* | 1/2013 | Hadley ................. A01D 46/08 56/28 |
| 2017/0172070 | A1* | 6/2017 | Conley ................. A01D 90/08 |

FOREIGN PATENT DOCUMENTS

| | | |
|---|---|---|
| CN | 202743874 | 2/2013 |
| CN | 106034575 | 10/2016 |
| CN | 106358605 | 2/2017 |
| CN | 107371645 | 11/2017 |
| CN | 109429741 | 3/2019 |
| CN | 210694963 | 6/2020 |
| CN | 114946412 | 8/2022 |
| DE | 102006051622 | 5/2008 |
| JP | 2008182980 | 8/2008 |

OTHER PUBLICATIONS

"Written Opinion of the International Searching Authority (Form PCT/ISA/237) of PCT/CN2023/134910," mailed on Jul. 26, 2024 with English translation thereof, pp. 1-7.

* cited by examiner

REED BALING AND STACKING DEVICE, METHOD, AND HARVESTER

CROSS-REFERENCE TO RELATED APPLICATION

This application is a 371 of international application of PCT application serial no. PCT/CN2023/134910, filed on Nov. 29, 2023, which claims the priority benefit of China application no. 202311440800.0, filed on Nov. 1, 2023. The entirety of each of the above mentioned patent applications is hereby incorporated by reference herein and made a part of this specification.

TECHNICAL FIELD

The present disclosure belongs to the technical field of agricultural machinery, and particularly relates to a reed baling and stacking device, a method, and a harvester.

BACKGROUND

As tall grasses, reeds are usually found in wetlands, and possess the fine texture and rich cellulose. The mature reeds can be taken as an industrial material for papermaking, building materials, artificial fibers, etc. The processed reed stems can further be weaved into various artwares, and are highly economical and practical. At present, in China, the reeds in the wetlands are mainly harvested manually, and are less harvested mechanically. The manual harvesting is time-consuming and labor-consuming with low production efficiency. The mechanical harvesting is far behind other countries, particularly in the integrated whole-stem harvesting technology.

Besides, with the low level of mechanical harvesting, the baled reeds are put into a feed box manually with a high labor intensity. Meanwhile, at least two workers are needed for one machine to take charge of conveyance and stacking. The working environment on the machine is also unsafe. After the feed box is filled up, the reeds are further delivered to an unloader. Therefore, the one-time harvest requires a plurality of people to work together, thus causing the high labor intensity, and the waste of time and labor.

SUMMARY

In view of the above technical problems, the present disclosure provides a reed baling and stacking device, and a method. By knotting reeds into small bales, stacking the small bales to a feed box vertically or horizontally, knotting the small bales into a big bale, and unloading the big bale mechanically, the present disclosure can improve the harvesting efficiency.

The present disclosure further provides a harvester including the reed baling and stacking device.

It is to be noted that disclosures on these objectives do not exclude presence of other objectives. One implementation in the present disclosure is unnecessarily intended to realize all of the above objectives. Objectives other than the above objectives can be extracted from the disclosures in the specification, drawings, and claims.

The present disclosure achieves the above technical objective through following technical solutions.

The present disclosure provides a reed baling and stacking device, including a knotter, a feed box, a stacking mechanism, and a control unit, where the stacking mechanism is located between the knotter and the feed box; the knotter is configured to knot reeds into small bales; the stacking mechanism is configured to stack the small bales of the reeds to the feed box vertically or horizontally; and the feed box is configured to knot the small bales of the reeds into a big bale;

the control unit is connected to the feed box and the stacking mechanism;

the stacking mechanism includes a first mechanical clamp, a second mechanical clamp, and a drive component connected to the control unit;

the first mechanical clamp and the second mechanical clamp are opposite to each other; the first mechanical clamp and the second mechanical clamp are connected to the drive component; the drive component is configured to drive the first mechanical clamp and the second mechanical clamp to move along an X-axis direction, a Y-axis direction, and a Z-axis direction; and the first mechanical clamp and the second mechanical clamp are configured to clamp and stack the small bales of the reeds to the feed box;

the feed box includes a feed box housing; and a baling mechanism is provided in the feed box housing; the baling mechanism includes a wire clamp and a drive mechanism; the wire clamp is configured to clamp steel wires; and the drive mechanism is configured to drive the wire clamp to knot the small bales of the reeds into the big bale.

Further, the drive component includes a first drive mechanism, a second drive mechanism, a third drive mechanism, a fourth drive mechanism, a fifth drive mechanism, a sixth drive mechanism, a first execution mechanism, and a second execution mechanism that are connected to the control unit;

the first mechanical clamp is connected to one end of the third drive mechanism; an other end of the third drive mechanism is connected to one end of the first drive mechanism through the first execution mechanism; an other end of the first drive mechanism is connected to one end of the fifth drive mechanism; an other end of the fifth drive mechanism is provided at a position of a harvester chassis close to the knotter; the first drive mechanism is configured to adjust movement of the first mechanical clamp along the X-axis direction; the third drive mechanism is configured to adjust movement of the first mechanical clamp along the Y-axis direction; the fifth drive mechanism is configured to adjust movement of the first mechanical clamp along the Z-axis direction; and the first execution mechanism is configured to drive the third drive mechanism to rotate the first mechanical clamp, such that the first mechanical clamp is vertical or horizontal; and the second mechanical clamp is connected to one end of the fourth drive mechanism; an other end of the fourth drive mechanism is connected to one end of the second drive mechanism through the second execution mechanism; an other end of the second drive mechanism is connected to one end of the sixth drive mechanism; an other end of the sixth drive mechanism is provided at a position of the harvester chassis close to the knotter; the second drive mechanism is configured to adjust movement of the second mechanical clamp along the X-axis direction; the fourth drive mechanism is configured to adjust movement of the second mechanical clamp along the Y-axis direction; the sixth drive mechanism is configured to adjust movement of the second mechanical clamp along the Z-axis direction; and the second execution mechanism is configured to drive the fourth drive mechanism to rotate the second mechanical clamp, such that the second mechanical clamp is vertical or horizontal.

Further, the wire clamp includes a first wire clamp, a second wire clamp, a third wire clamp, and a fourth wire clamp;

the first wire clamp, the second wire clamp, the third wire clamp, and the fourth wire clamp are connected to the feed box housing through the drive mechanism; the first wire clamp and the second wire clamp are provided oppositely at one side in the feed box housing; and the third wire clamp and the fourth wire clamp are provided oppositely at an other side in the feed box housing;

the drive mechanism includes a ninth drive mechanism, an eleventh drive mechanism, and a twelfth drive mechanism; the ninth drive mechanism includes one end connected to the twelfth drive mechanism provided on a bottom plate of the feed box housing, and an other end connected to one end of the eleventh drive mechanism; an other end of the eleventh drive mechanism is connected to the wire clamp; the ninth drive mechanism is configured to drive the eleventh drive mechanism to move up and down, to adjust a height of the wire clamp; the eleventh drive mechanism is configured to drive the wire clamp to move left and right; and the twelfth drive mechanism is configured to drive the ninth drive mechanism to move the wire clamp back and forth; and the ninth drive mechanism and the eleventh drive mechanism are connected to the control unit.

Further, the wire clamp includes two wire clamping members, a shaft, a seventh drive mechanism, and an eighth drive mechanism; and the two wire clamping members are connected through the shaft, and arranged in an X shape; the two wire clamping members are respectively connected to the seventh drive mechanism and the eighth drive mechanism; the seventh drive mechanism and the eighth drive mechanism are connected to the control unit; and the seventh drive mechanism and the eighth drive mechanism are configured to respectively drive the two wire clamping members to rotate around the shaft, thereby adjusting an included angle between the two wire clamping members to clamp or release the steel wires.

Further, the feed box further includes a rotating shaft and a tenth drive mechanism;

the rotating shaft is provided at a side of the feed box housing close to a feed box door, and one end of the rotating shaft is connected to a harvester frame through a bearing;

the tenth drive mechanism is provided at a side of the feed box housing away from the feed box door, and the tenth drive mechanism is configured to drive one side of the feed box housing to move up and down, such that the feed box housing rotates around the rotating shaft to unload the big bale of the reeds from the feed box door; and the tenth drive mechanism is connected to the control unit.

Further, a wire box, a displacement sensor, a photoelectric sensor, and a wire box switch are provided on the feed box housing;

the steel wires are provided in the wire box; and the displacement sensor is configured to detect an upward moving height of the wire clamp; when the displacement sensor detects that the wire clamp moves up to a preset height, and transmits a signal to the control unit, the control unit controls the wire box switch to open the wire box, such that the steel wires fall off from the wire box; and when the photoelectric sensor senses that the steel wires fall off, and transmits a signal to the control unit, the control unit controls the wire box switch to close the wire box.

The present disclosure provides a harvester, including the reed baling and stacking device.

The present disclosure provides a control method of the reed baling and stacking device, including following steps:

knotting, by the knotter, the reeds into the small bales;

controlling, by the control unit, the drive component of the stacking mechanism to drive the first mechanical clamp and the second mechanical clamp to move along the X-axis direction, the Y-axis direction, and the Z-axis direction, such that the small bales of the reeds are clamped by the first mechanical clamp and the second mechanical clamp and stacked to the feed box; and controlling, by the control unit, the wire clamp of the baling mechanism in the feed box to clamp the steel wires, and the drive mechanism to drive the wire clamp to knot the small bales of the reeds into the big bale.

In the above solutions, the control method further includes: in response to vertical stacking, controlling, by the control unit, the stacking mechanism to stack a plurality of the small bales of the reeds to the feed box vertically;

when a number of the small bales of the reeds reaches a preset value, controlling, by the control unit, the drive mechanism to drive the wire clamp to move up; when the displacement sensor detects that the wire clamp moves up to a preset height, and transmits a signal to the control unit, controlling, by the control unit, the wire box switch to open the wire box, such that the steel wires fall off from the wire box; and when the photoelectric sensor senses that the steel wires fall off, and transmits a signal to the control unit, controlling, by the control unit, the wire box switch to close the wire box; and controlling, by the control unit, the drive mechanism to drive the wire clamp to knot the plurality of the small bales of the reeds into the big bale.

In the above solutions, the control method further includes: controlling, by the control unit, the ninth drive mechanism, such that the first wire clamp and the second wire clamp opposite to each other have different heights, and clamp the steel wire; and controlling, by the control unit, the third wire clamp and the fourth wire clamp opposite to each other to release the steel wires, and the first wire clamp and the second wire clamp to continuously clamp the steel wires and move toward each other, such that the steel wires are intertwined and attached to the big bale of the reeds, thereby completing baling.

In the above solutions, the control method further includes: in response to horizontal stacking, controlling, by the control unit, the stacking mechanism to stack a plurality of the small bales of the reeds to the feed box horizontally;

when a number of the small bales of the reeds reaches a preset value, controlling, by the control unit, the ninth drive mechanism to drive the wire clamp to move up to a preset position, where the first wire clamp and the second wire clamp are connected to a same one of the steel wires, and the third wire clamp and the fourth wire clamp are connected to the same one of the steel wires; and controlling the first wire clamp and the second wire clamp to stagger in the Y-axis direction, the third wire clamp and the fourth wire clamp to stagger in the Y-axis direction, the first wire clamp and the second wire clamp to move toward each other, and the third wire clamp and the fourth wire clamp to move toward each other, where the small bales of the reeds are tensioned through the steel wires, and two of the steel wires come into use at the same time to increase a binding force for the big bale of the reeds; then, under an action of the twelfth drive mechanism, controlling the first wire clamp and the second wire clamp to move in opposite directions in the Y-axis direction, and the third wire clamp and the fourth wire clamp to move in opposite directions in the Y-axis direction; and at last, under an action of the eleventh drive mechanism, controlling the first wire clamp and the second wire clamp to move in opposite directions in the X-axis direction to form a loop, and the third wire clamp and the fourth wire clamp to move in opposite directions in the X-axis direction to form a loop, thereby completing knotting in baling of the reeds.

Compared with the prior art, the present disclosure has the following advantages.

1. According to the present disclosure, the baled reeds are clamped by the mechanical clamps at two sides. The left mechanical clamp and right mechanical clamp are configured to clamp and release the bales of reeds through the drive component. The bales of reeds are stacked to the feed box vertically or horizontally after clamped. When the feed box is stacked completely, the small bales of reeds are knotted into the big bale through the baling mechanism in the feed box. With the mechanical clamps for stacking the bales of reeds instead of the manual work, the present disclosure greatly reduces a labor intensity, improves working efficiency and an intelligent level of the reed harvester, and provides a desirable technical support for intelligent harvesting of the reed harvester. Since the mechanical clamps can realize the vertical stacking and the horizontal stacking, the present disclosure is flexible in structure, and applicable to the feed box to unload the reeds in different directions.

2. According to the present disclosure, the drive mechanism under the control of the control unit drives one side of the feed box housing to move up and down, such that the feed box housing rotates around the rotating shaft to unload the big bale of reeds from the feed box door.

With an automatic unloading feed box instead of the conventional feed box, the present disclosure does not need manual operation. The knotted big bale falls into a field by means of the side rotation and the gravity.

3. The four wire clamps under the driving of the drive mechanism move to realize the baling, so the present disclosure achieves the simple structure, and the simple operation.

4. According to the present disclosure, the wire box has the simple structure. When the reeds are to be baled vertically, the wire box releases the wire automatically, thereby saving the manpower, and improving the efficiency.

It is to be noted that disclosures on these effects do not exclude presence of other effects.

One implementation of the present disclosure unnecessarily has all of the above effects. Other effects can be obtained apparently from the description, drawings, claims and so on.

BRIEF DESCRIPTION OF THE DRAWINGS

FIGS. 15A to 15C are schematic diagrams of a baling process in horizontal stacking according to an implementation of the present disclosure, in which FIG. 15A illustrates an initial state when reeds are sleeved by a steel wire, FIG. 15B illustrates an intermediate process when the steel wire rotates for knotting, and FIG. 15C illustrates a process after the steel wire rotates for the knotting.

DETAILED DESCRIPTION OF THE EMBODIMENTS

Figure 1:
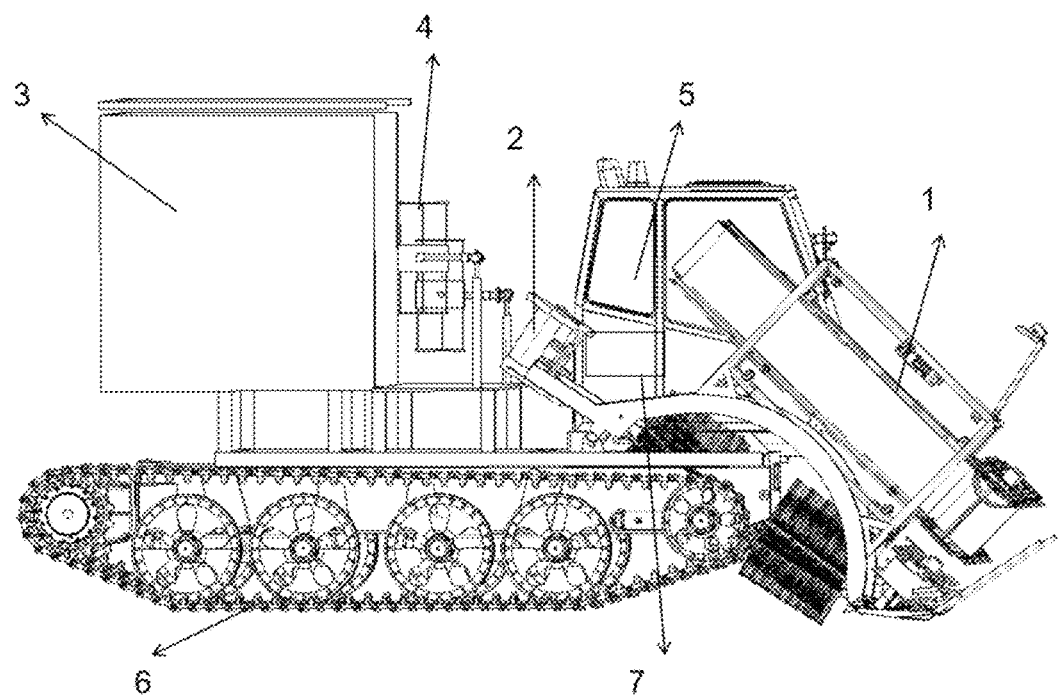
FIG. 1 is a schematic structural diagram of a reed baling and stacking device according to an implementation of the present disclosure.

The embodiments of the present disclosure are described below in detail. Examples of the embodiments are shown in the drawings. The same or similar numerals represent the same or similar elements or elements having the same or similar functions throughout the specification. The embodiments described below with reference to the accompanying drawings are exemplary, and are intended to explain the present disclosure but should not be construed as a limitation to the present disclosure.

It should be understood that, in the description of the present disclosure, the terms such as "central", "longitudinal", "transverse", "length", "width", "thickness", "front", "rear", "left", "right", "upper", "lower", "axial", "radial", "vertical", "horizontal", "inner", and "outer" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. In addition, the terms such as "first" and "second" are used only for descriptive purposes, and should not be construed as indicating or implying relative importance or implying the number of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and limited, the terms "installed", "connected with", "connected to", and "fixed" should be understood in a board sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present disclosure based on a specific situation.

Embodiment 1

FIG. 1 illustrates a reed baling and stacking device according to a preferred implementation. The reed baling and stacking device includes a knotter 2, a feed box 3, a stacking mechanism 4, and a control unit 7.

Figure 2:
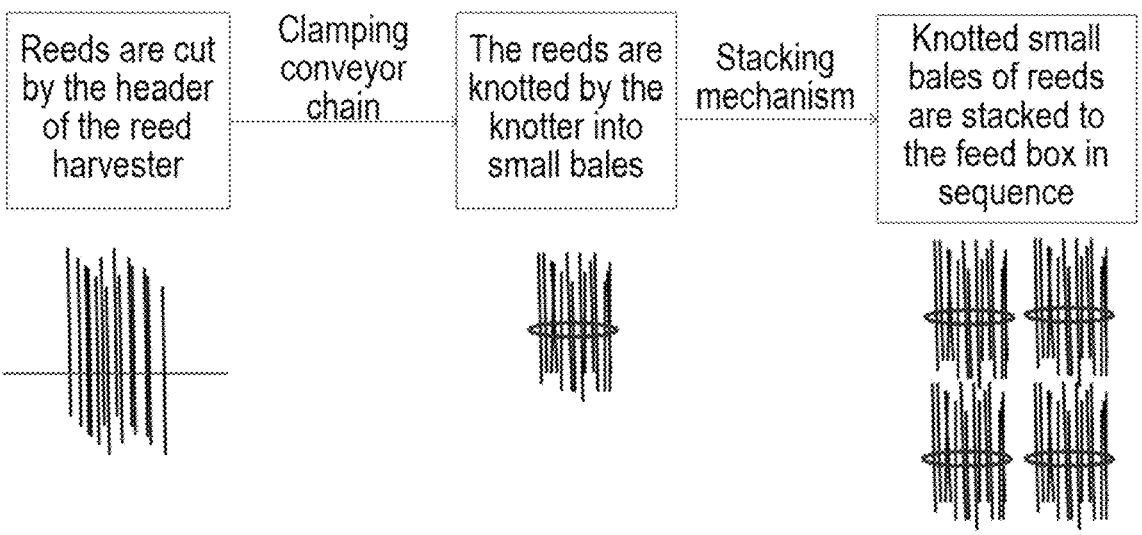
FIG. 2 is a schematic working diagram illustrating that baled reeds can be automatically conveyed and stacked to a feed box according to an implementation of the present disclosure.

The knotter 2 is located behind a header 1 and a conveyor mechanism. The stacking mechanism 4 is located between the knotter 2 and the feed box 3. The knotter 2 is configured to knot reeds into small bales. The stacking mechanism 4 is configured to stack the small bales of reeds to the feed box 3 vertically or horizontally. The feed box 3 is configured to knot the small bales of reeds into a big bale, as shown in FIG. 2.

The control unit 7 is connected to the feed box 3 and the stacking mechanism 4.

Figure 3:
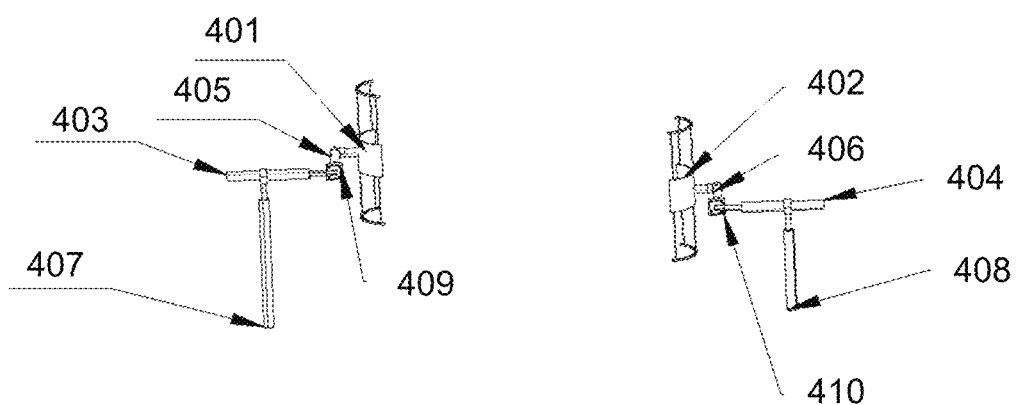
FIG. 3 is a schematic structural diagram of a mechanical clamp according to an implementation of the present disclosure.

As shown in FIG. 3, according to the embodiment, preferably, the stacking mechanism 4 includes a first mechanical clamp 401, a second mechanical clamp 402, and a drive component connected to the control unit 7.

The first mechanical clamp 401 and the second mechanical clamp 402 are opposite to each other. The first mechanical clamp 401 and the second mechanical clamp 402 are connected to the drive component. The drive component is configured to drive the first mechanical clamp 401 and the second mechanical clamp 402 to move along an X-axis direction, a Y-axis direction, and a Z-axis direction. The first mechanical clamp 401 and the second mechanical clamp 402 are configured to clamp and stack the small bales of reeds to the feed box 3.

Further, the drive component includes a first drive mechanism 403, a second drive mechanism 404, a third drive mechanism 405, a fourth drive mechanism 406, a fifth drive mechanism 407, a sixth drive mechanism 408, a first execution mechanism 409, and a second execution mechanism 410 that are connected to the control unit 7.

The first mechanical clamp 401 is connected to one end of the third drive mechanism 405. The other end of the third drive mechanism 405 is connected to one end of the first drive mechanism 403 through the first execution mechanism 409. The other end of the first drive mechanism 403 is connected to one end of the fifth drive mechanism 407. The other end of the fifth drive mechanism 407 is provided at a position of a harvester chassis 6 close to the knotter 2. The first drive mechanism 403 is configured to adjust movement of the first mechanical clamp 401 along the X-axis direction. The third drive mechanism 405 is configured to adjust movement of the first mechanical clamp 401 along the Y-axis direction. The fifth drive mechanism 407 is configured to adjust movement of the first mechanical clamp 401 along the Z-axis direction. The first execution mechanism 409 is configured to drive the third drive mechanism 405 to rotate the first mechanical clamp 401, such that the first mechanical clamp 401 is vertical or horizontal.

The second mechanical clamp 402 is connected to one end of the fourth drive mechanism 406. The other end of the fourth drive mechanism 406 is connected to one end of the second drive mechanism 404 through the second execution mechanism 410. The other end of the second drive mechanism 404 is connected to one end of the sixth drive mechanism 408. The other end of the sixth drive mechanism 408 is provided at a position of the harvester chassis 6 close to the knotter 2. The second drive mechanism 404 is configured to adjust movement of the second mechanical clamp 402 along the X-axis direction. The fourth drive mechanism 406 is configured to adjust movement of the second mechanical clamp 402 along the Y-axis direction. The sixth drive mechanism 408 is configured to adjust movement of the second mechanical clamp 402 along the Z-axis direction. The second execution mechanism 410 is configured to drive the fourth drive mechanism 406 to rotate the second mechanical clamp 402, such that the second mechanical clamp 402 is vertical or horizontal.

According to the embodiment, preferably, the first drive mechanism 403, the second drive mechanism 404, the third drive mechanism 405, the fourth drive mechanism 406, the fifth drive mechanism 407, and the sixth drive mechanism 408 each are a hydraulic cylinder.

In an implementation of the present disclosure, a linear displacement sensor is provided on the hydraulic cylinder, and configured to detect an amount of extension and retraction of the hydraulic cylinder, and feed the amount of extension and retraction of the hydraulic cylinder back to the control unit 7. The control unit 7 is configured to adjust the amount of extension and retraction of the hydraulic cylinder according to a preset value.

According to the embodiment, preferably, the first execution mechanism 409 and the second execution mechanism 410 each are a hydraulic motor.

In an implementation of the present disclosure, the stacking mechanism 4 has the following stacking process:

Through extension and retraction of the first drive mechanism 403 and the second drive mechanism 404, the mechanical clamps are respectively adjusted to initial positions, namely reed baling positions. Thereafter, the left mechanical clamp and the right mechanical clamp are adjusted to clamp the bales of reeds and convey the bales of reeds to the feed box for stacking.

In an implementation of the present disclosure, the baling positions are fittingly located at an edge of the feed box 3. According to the baling positions, the initial positions of the mechanical clamps can be adjusted again. Hence, based on the initial positions, a displacement of the first drive mechanism 403 and a displacement of the second drive mechanism 404 are two x coordinates in a first row for stacking. Then, the third drive mechanism 405 and the fourth drive mechanism 406 come into use. By extending the hydraulic cylinders, the mechanical clamps are driven to move in the y-axis direction to stack the reeds in sequence. Displacements of all hydraulic cylinders are measured and located by the linear displacement sensor.

Figure 4:
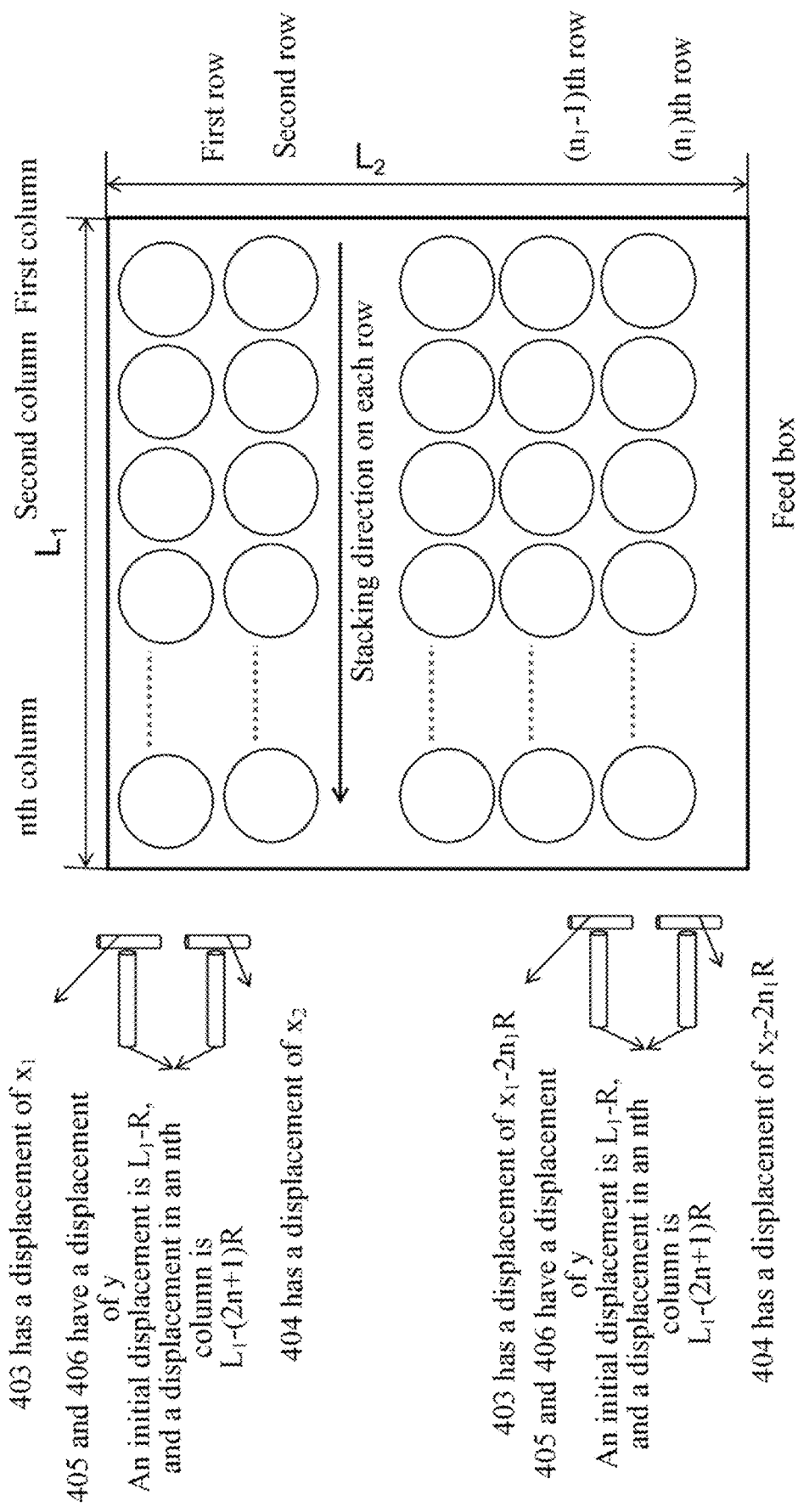
FIG. 4 is a schematic arrangement diagram when reeds are vertically conveyed and stacked according to an implementation of the present disclosure.

As shown in FIG. 4, in an implementation of the present disclosure, the stacking mechanism 4 is configured to stack the small bales of reeds to the feed box 3 vertically or horizontally in sequence. This makes reasonable use of a space of the feed box 3 to stack the bales of reeds, facilitates efficient recycling of the reeds, and also facilitates subsequent knotting of the small bales into the big bale in the feed box 3.

In an implementation of the present disclosure, the stacking mechanism 4 realizes vertical stacking on the bales of reeds in a following manner. As is known, the bales of reeds to be baled each have a radius of R, the R is determined by the knotter, and the feed box has a length of $L_1$ along the y-axis direction. In this case, a number of columns for stacking the bales of reeds in the feed box can be calculated as n, $n=(L_1/2R)$, n being an integer with a decimal rejected. From the initial positions of the mechanical clamps, namely the initial displacement of the first drive mechanism 403 and the initial displacement of the second drive mechanism 404 are respectively $x_1$ and $x_2$, the third drive mechanism 405 and the fourth drive mechanism 406 for stacking a first bale of reeds each have a displacement of $L_1-R$. A real-time position relationship between the mechanical clamps for stacking the bale of reeds can be characterized by three parameters. The three parameters are respectively the displacement $x_{left}$ of the first drive mechanism, the displacement $x_{right}$ of the second drive mechanism, and the displacement y of the third drive mechanism or the fourth drive mechanism. The third drive mechanism 405 and the fourth drive mechanism 406 each have the initial position located at the edge of the feed box 3, and have a displacement of zero in this case. Three parameters corresponding to the first bale of reeds stacked in the first row are $x_1$, $x_2$, and $L_1-R$ respectively, three parameters corresponding to a second bale of reeds stacked in the first row are $x_1$, $x_2$, and $L_1-3R$ respectively, until an nth bale of reeds is stacked in the first row and corresponding three parameters are $x_1$, $x_2$, and $L_1-(2n+1)R$ respectively.

The parameters of the first bale of reeds in the first row are $x_1$, $x_2$, and $L_1-R$.

The parameters of the second bale of reeds in the first row are $x_1$, $x_2$, and $L_1-3R$.

. . .

The parameters of the nth bale of reeds in the first row are $x_1$, $x_2$, and $L_1-(2n+1)R$.

Once the mechanical clamps reach a position for stacking the bale of reeds, the second drive mechanism 404 is adjusted, such that the second mechanical clamp 402 is loosened to release the bale of reeds and return to the initial position to clamp another bale of reeds again. In order to prevent contact between the second mechanical clamp 402 and a right cover of the feed box when the bales of reeds are stacked on a last row, an enough space is required. Generally, if a minimum spatial distance when the device does not come into contact is h, a number of stackable rows is $n_1=(L_2-h)/2R$, $n_1$ being an integer with a decimal rejected.

The parameters of the first bale of reeds in the second row are $x_1+2R$, $x_2-2R$, and $L_1-R$.

The parameters of the second bale of reeds in the second row are $x_1+2R$, $x_2-2R$, and $L_1-3R$.

. . .

The parameters of the nth bale of reeds in the second row are $x_1+2R$, $x_2-2R$, and $L_1-(2n+1)R$.

The bales of reeds are placed to an $(n_1)$th row in sequence. In this case, the parameters are as follows:

The parameters of the first bale of reeds in the $(n_1)$th row are $x_1+2n_1R$, $x_2-2n_1R$, and $L_1-R$.

The parameters of the second bale of reeds in the $(n_1)$th row are $x_1+2n_1R$, $x_2-2n_1R$, and $L_1-3R$.

. . .

The parameters of the first bale of reeds in the $(n_1)$th row are $x_1+2n_1R$, $x_2-2n_1R$, and $L_1-(2n+1)R$.

Figure 5:
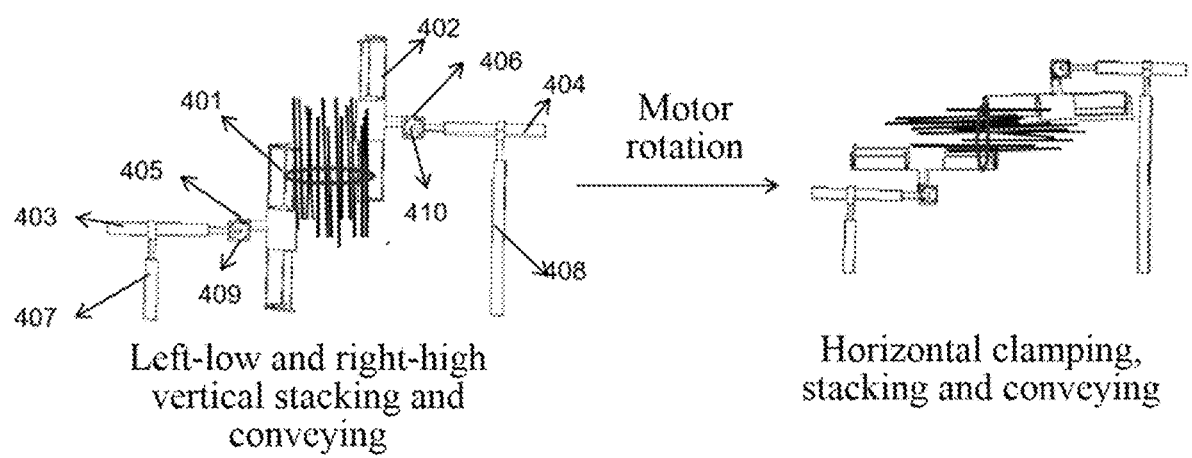
FIG. 5 is a schematic diagram illustrating that a mechanical clamp changes from a vertical state to a horizontal state according to an implementation of the present disclosure.

As shown in FIG. 5, in an implementation of the present disclosure, the mechanical clamps each are shaped as a circular arc, which facilitates contact with the bale of reeds and facilitates clamping. The mechanical clamps at two sides are provided up and down. This not only can ensure that the bale of reeds is clamped, stacked and conveyed vertically, but also can ensure that the mechanical clamps do not affect horizontal clamping on the bale of reeds after rotating 90 degrees. With one mechanical clamp above and one mechanical clamp below, the horizontal stacking is realized.

In an implementation of the present disclosure, when the bale of reeds is to be stacked horizontally, the bale of reeds is clamped vertically by the mechanical clamps. The hydraulic motor is configured to rotate a shaft connected to the mechanical clamps, and drive the shaft to rotate 90 degrees. The two vertical mechanical clamps are rotated to a horizontal position. Under an action of the left second drive mechanism 404, the bale of reeds is conveyed to the first row in the feed box. In order to ensure that the lower mechanical clamp has an enough movable space for extension and retraction, and the bale of reeds falls off, a considerable space should be kept from a left side of the feed box 3. This ensures that the present lower mechanical clamp can move for withdrawal. The spatial distance is set as m. The m is associated with a length of the bale of reeds and a width of the feed box.

Figure 6:
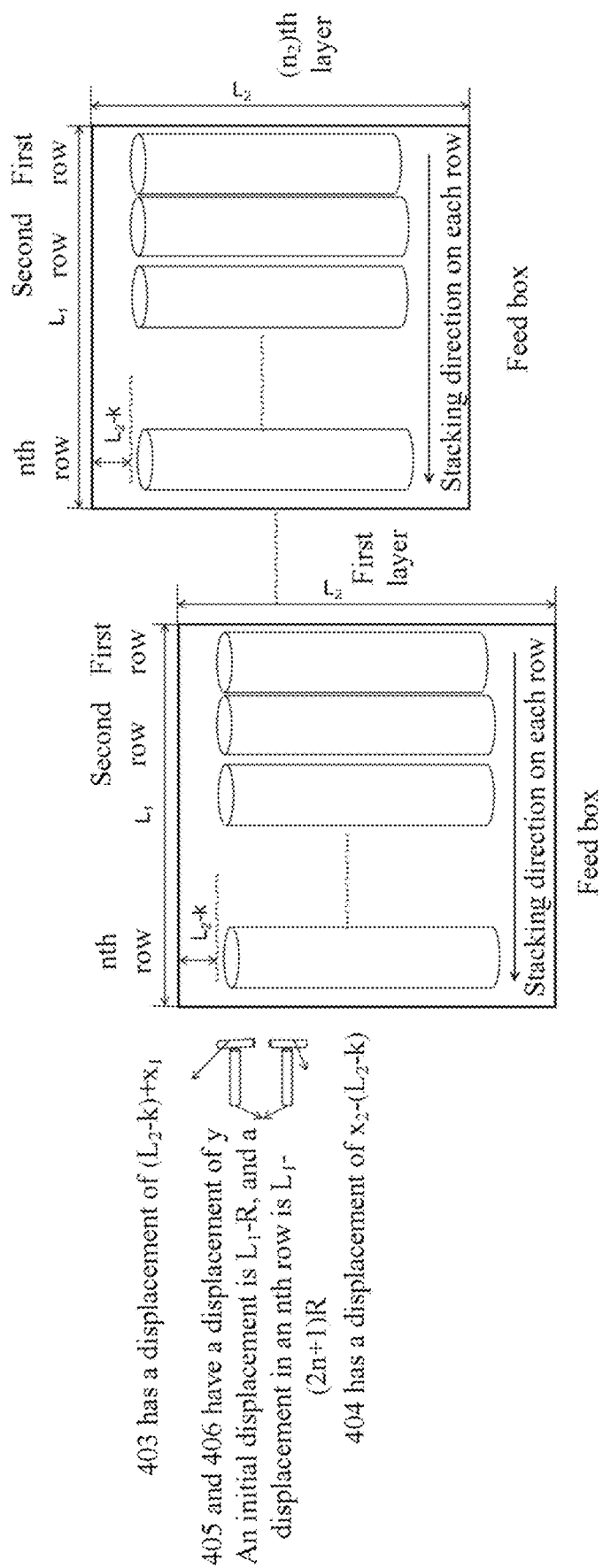
FIG. 6 is a schematic arrangement diagram when reeds are horizontally conveyed and stacked according to an implementation of the present disclosure.

As shown in FIG. 6, the feed box has a width of $L_2$ along the x-axis direction, and the bale of reeds has a height of k. When the bale of reeds is stacked horizontally by the mechanical clamps, the lower mechanical clamp is basically near a root of the bale of reeds. Hence, a space reserved for the mechanical clamp for extension and retraction is $L_2-k$, $L_2-k$ being greater than a height of the mechanical clamp. When the lower mechanical clamp moves toward the remaining space, the upper mechanical clamp extends downward under an action of an up-down position adjusting hydraulic cylinder, and can apply a downward force to the bale of reeds. With simultaneous movement in two directions, it can be ensured that the bale of reeds is released from the mechanical clamps and conveyed horizontally. Then, the mechanical clamps return to the initial positions to clamp and convey a second bale of reeds for sequential stacking. For the second bale of reeds in the first row, the y parameter is $y-3R$, the left parameter $x_{left}$ is $(L_2-k)+x_1$, and the right parameter $x_{right}$ moves rightward by $L_2-k$ on the basis of the displacement $x_2$ of the cylinder in the original vertical clamping, that is, the $x_{right}$ is $x_2-(L_2-k)$.

n rows can be stacked on each layer, $n=L_1/2R$. After a first layer is stacked completely, a second layer is stacked from a position for a first bale of reeds. Three parameters for the bale of reeds in each row of the second layer are the same as those for the bale of reeds in each row of the first layer. Until a last row on an $(n_2)$th layer is stacked, the small bales are baled into the big bale and unloaded by a driver. $n_2=L_3/2R$ ($n_2$ being an integer with a decimal rejected), $L_3$ being the height of the feed box. When the bales of reeds are to be stacked horizontally, three parameters ($x_{left}$, $x_{right}$, and y) change as follows:

First row on the first layer: $(L_2-k)+x_1$, $x_2-(L_2-k)$, and y-R.

Second row on the first layer: $(L_2-k)+x_1$, $x_2-(L_2-k)$, and y-3R.

. . .

nth row on the first layer: $(L_2-k)+x_1$, $x_2-(L_2-k)$, and y-(2n+1)R.

After the first layer is stacked completely, the second layer is stacked. For the second layer, the parameters for the bales of reeds in each row are the same as those for the bales of reeds in the first row, provided that the displacement of the hydraulic cylinder at the height of the mechanical clamp is adjusted. Until the bales of reeds are stacked in an nth row on the $(n_2)$th layer completely, the present stacking is ended and unloading is performed.

Figure 7:
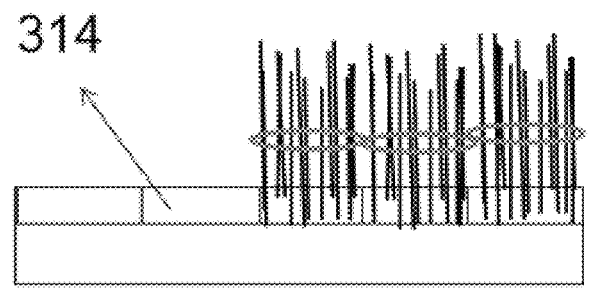
FIG. 7 illustrates a groove of a feed box according to an implementation of the present disclosure.
Figure 8:
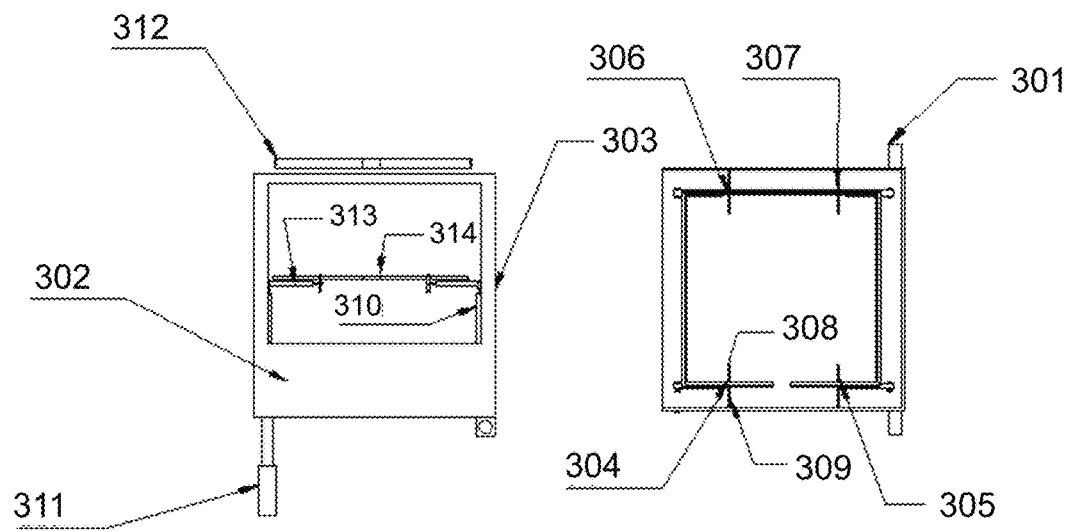
FIG. 8 is a schematic structural diagram of a feed box according to an implementation of the present disclosure.

According to the embodiment, preferably, in order to ensure that the small bales of reeds entering the feed box 3 in the vertical stacking do not topple and fall, a small groove with a certain height may be formed in a bottom of the feed box 3, such that the stacked small bales of reeds are stacked in the feed box 3 vertically and stably, as shown in FIG. 7.

As shown in FIGS. 8-15A. 15B and 15C, according to the embodiment, preferably, the feed box 3 includes a feed box housing 302.

A baling mechanism is provided in the feed box housing 302. The baling mechanism includes wire clamps and a drive mechanism. The wire clamps are configured to clamp a steel wire 314. The drive mechanism is configured to drive the wire clamps to knot the small bales of reeds into the big bale.

In an implementation of the present disclosure, the wire clamps include a first wire clamp 304, a second wire clamp 305, a third wire clamp 306, and a fourth wire clamp 307.

The first wire clamp 304, the second wire clamp 305, the third wire clamp 306, and the fourth wire clamp 307 are connected to the feed box housing 302 through the drive mechanism. The first wire clamp 304 and the second wire clamp 305 are provided oppositely at one side in the feed box housing 302. The third wire clamp 306 and the fourth wire clamp 307 are provided oppositely at the other side in the feed box housing 302.

The drive mechanism includes a ninth drive mechanism 310, an eleventh drive mechanism 313, and a twelfth drive mechanism 315. One end of the ninth drive mechanism 310 is connected to the twelfth drive mechanism 315 provided on a bottom plate of the feed box housing 302, and the other end of the ninth drive mechanism 310 is connected to one end of the eleventh drive mechanism 313. The other end of the eleventh drive mechanism 313 is connected to the wire clamp. The ninth drive mechanism 310 is configured to drive the eleventh drive mechanism 313 to move up and down, so as to adjust a height of the wire clamp. The eleventh drive mechanism 313 is configured to drive the wire clamp to move left and right. The twelfth drive mechanism 315 is configured to drive the ninth drive mechanism 310 to move the wire clamp back and forth.

The ninth drive mechanism 310 and the eleventh drive mechanism 313 are connected to the control unit 7.

Figure 9:
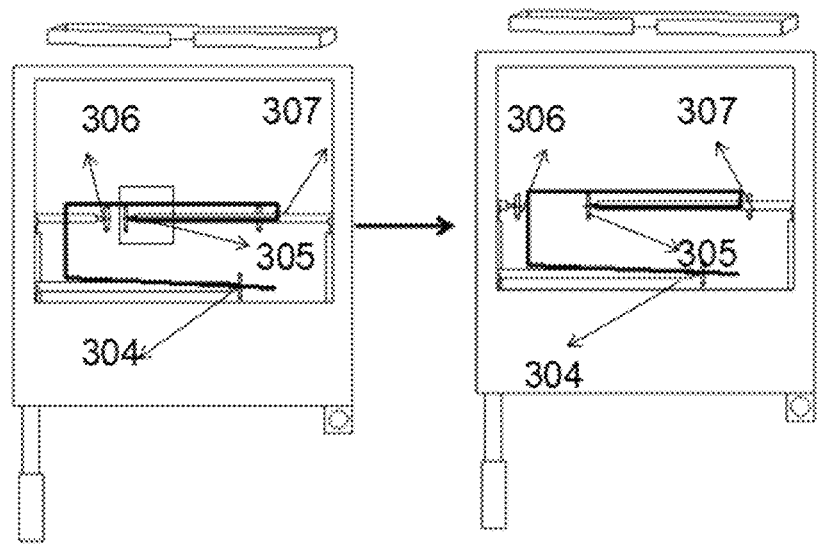
FIG. 9 is a schematic diagram illustrating that a wire clamp moves to drive a steel wire to tension and bind a big bale of reeds according to an implementation of the present disclosure.
Figure 12:
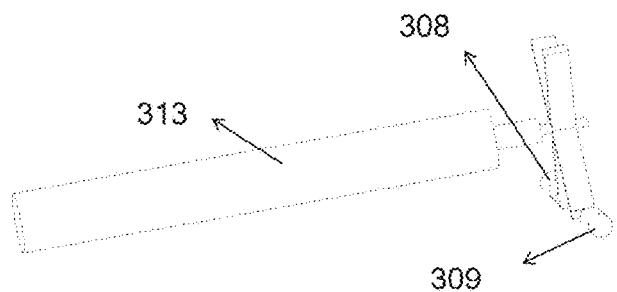
FIG. 12 is a schematic structural diagram of a wire clamp according to an implementation of the present disclosure.

FIG. 9 is a schematic diagram illustrating that a wire clamp moves to drive a steel wire to tension and bind a big bale of reeds according to an implementation of the present disclosure. The first wire clamp 304 and the second wire clamp 305 move to release the steel wire. The third wire clamp 306 and the fourth wire clamp 307 move relatively to tension the steel wire. In an implementation of the present disclosure, the seventh drive mechanism 308, the eighth drive mechanism 309, the ninth drive mechanism 310, the eleventh drive mechanism 313, and the twelfth drive mechanism 315 each are a hydraulic cylinder. As shown in FIG. 12, in an implementation of the present disclosure, the wire clamps each include two wire clamping members, a shaft, a seventh drive mechanism 308, and an eighth drive mechanism 309.

The two wire clamping members are connected through the shaft, and arranged in an X shape. The two wire clamping members are respectively connected to the seventh drive mechanism 308 and the eighth drive mechanism 309. The seventh drive mechanism 308 and the eighth drive mechanism 309 are connected to the control unit 7. The seventh drive mechanism 308 and the eighth drive mechanism 309 are configured to respectively drive the wire clamping members to rotate around the shaft, thereby adjusting an included angle between the wire clamping members to clamp or release the steel wire 314.

In an implementation of the present disclosure, the feed box 3 further includes a rotating shaft 301 and a tenth drive mechanism 311.

The rotating shaft 301 is provided at a side of the feed box housing 302 close to a feed box door 303, with one end connected to a harvester frame through a bearing.

The tenth drive mechanism 311 is provided at a side of the feedbox housing 302 away from the feed box door 303, and configured to drive one side of the feed box housing 302 to move up and down, such that the feed box housing 302 rotates around the rotating shaft 301 to unload the big bale of reeds from the feed box door 303.

Figure 11:
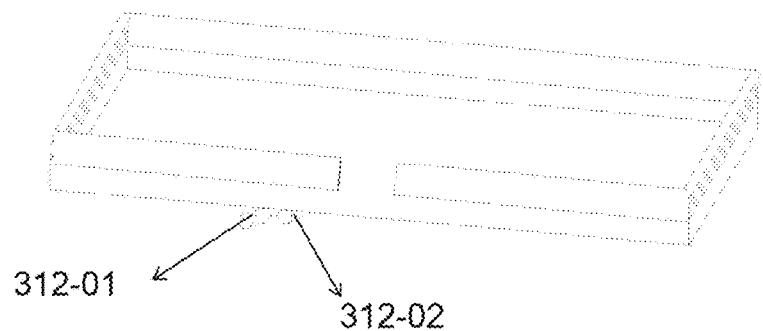
FIG. 11 is a schematic diagram of a movement process of a wire box according to an implementation of the present disclosure.

The tenth drive mechanism 311 is connected to the control unit 7. As shown in FIG. 11, in an implementation of the present disclosure, a wire box 312, a displacement sensor, a photoelectric sensor 312-01, and a wire box switch 312-02 are provided on the feed box housing 302.

The steel wire 314 is provided in the wire box 312.

The displacement sensor is configured to detect an upward moving height of the wire clamp. When the displacement sensor detects that the wire clamp moves up to a preset height, and transmits a signal to the control unit 7, the control unit 7 controls the wire box switch 312-02 to open the wire box 12, such that the steel wire 314 falls off from the wire box 12. After the photoelectric sensor 312-01 senses that the steel wire 314 falls off, and transmits a signal to the control unit 7, the control unit 7 controls the wire box switch 312-02 to close the wire box 12.

In an implementation of the present disclosure, the baling mechanism has the following movement process:

After small bales of reeds are placed completely in sequence, the first wire clamp 304, the second wire clamp 305, the third wire clamp 306, and the fourth wire clamp 307 move to a position under the wire box 312 under an action of the ninth drive mechanism 310. The steel wire 314 falls into the four wire clamps from the wire box 312. The seventh drive mechanism 308 and the eighth drive mechanism 309 at two sides of the wire clamps move in opposite directions to clamp the steel wire. After the steel wire is clamped, under an action of the ninth drive mechanism 310, the steel wire 314 moves to a middle position of the big bale of reeds.

Figure 14:
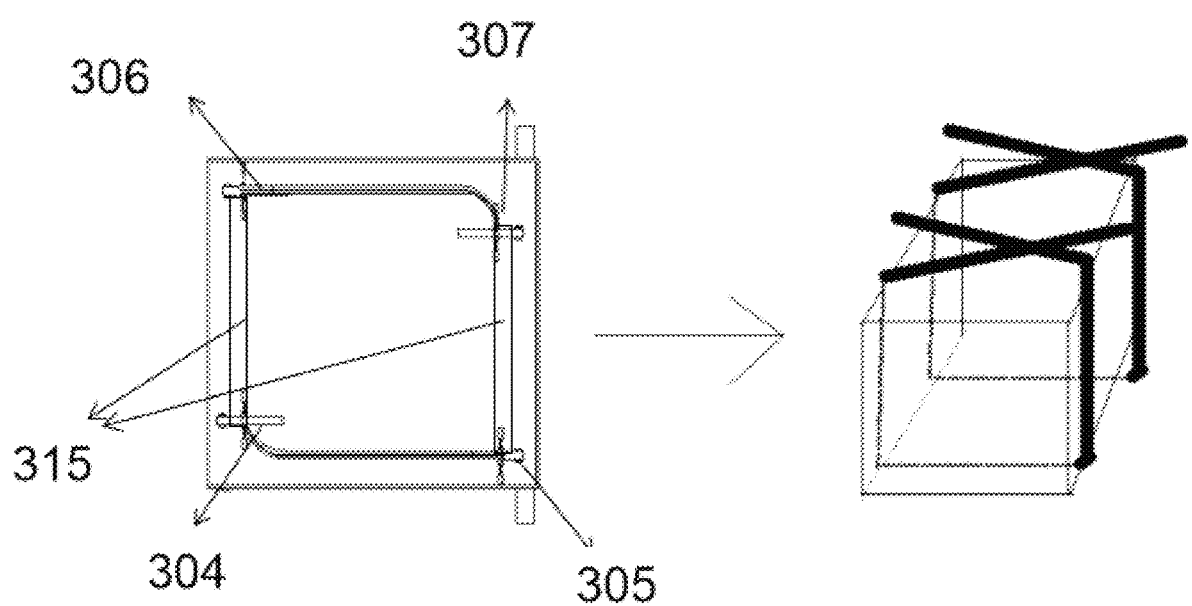
FIG. 14 is a schematic diagram of baling in horizontal stacking according to an implementation of the present disclosure.

As shown in FIG. 14, in an implementation of the present disclosure, the reeds are cut by the header. The reeds are conveyed by a clamping conveyor chain to the knotter 2. The reeds are knotted by the knotter 2 into the small bales. Through the mechanical clamps, the knotted small bales of reeds are stacked to the feed box 3. When the steel wire 314 is located at the middle position of the big bale of reeds, the first wire clamp 304 and the second wire clamp 305 are provided at different heights, and a height of the second wire clamp 305 is greater than a height of the first wire clamp 304. This can ensure that the first wire clamp 304 and the second wire clamp 305 can move relatively to tension the steel wire. Thereafter, the seventh drive mechanism 308 and the eighth drive mechanism 309 at two sides of the third wire clamp 306 and the fourth wire clamp 307 move in opposite directions to loosen the wire clamp, and move down under the action of the ninth drive mechanism 310. By this time, one side of the steel wire 314 is suspended at the middle position of the big bale of reeds. The other side of the steel wire 314 is continuously clamped by the first wire clamp 304 and the second wire clamp 305. Under an action of the eleventh drive mechanism 313, the first wire clamp 304 and the second wire clamp 305 are pushed to move toward each other, such that the steel wire 314 is intertwined and attached to the big bale of reeds. A left end and a right end of the steel wire 314 are staggered to ensure that the tensioned steel wire has an enough binding force to the big bale of reeds.

Figure 10:
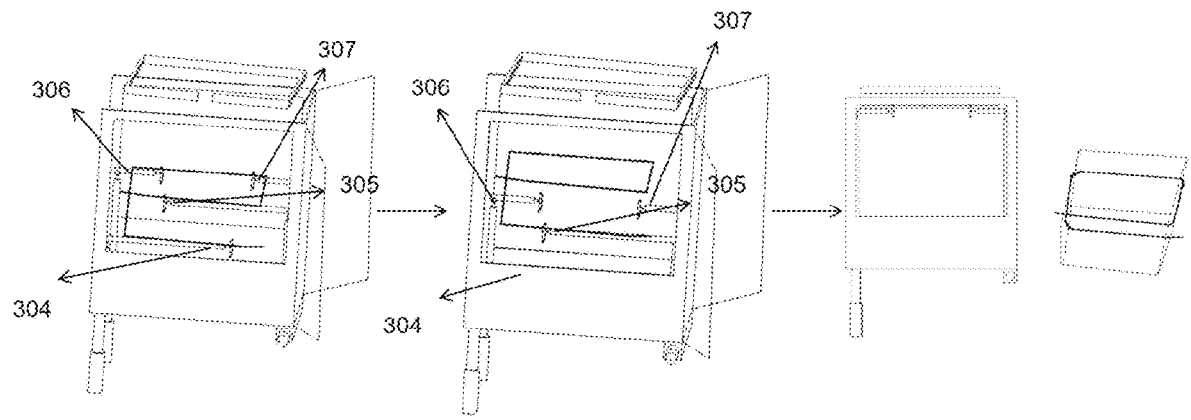
FIG. 10 is a schematic diagram of an unloading process of a feed box upon completion of baling according to an implementation of the present disclosure.

As shown in FIG. 10, after the big bale of reeds is bound, the four wire clamps move away from the steel wire 314 through the ninth drive mechanism 310. By this time, the feed box door 303 is open, the left side of the feed box 3 is raised through the tenth drive mechanism 311, and the big bale of reeds falls into a field along an oblique plane under an action of a gravity. Then, the feed box 3 is restored to an original position for next baling, the wire clamps clamp the steel wire again, and the feed box 3 is connected to the chassis 6 of a reed harvester through the rotating shaft 301.

After the big bale of reeds falls off, and the wire clamps move up to the position under the wire box 12, the wire box switch 312-02 is turned on, and the steel wire falls onto the wire clamps. When the photoelectric sensor 312-01 on the wire box switch 312-02 senses that the steel wire falls off, the wire box 12 is closed immediately to prevent other steel wires from falling off to cause a waste. The wire box 12 may be welded on the feed box 3

The wire clamp clamps the steel wire 314 through relative movement of the seventh drive mechanism 308 and the eighth drive mechanism 309. Through reverse movement of the seventh drive mechanism and the eighth drive mechanism, the steel wire 314 is released. A displacement of the steel wire in a left-right direction is adjusted through the eleventh drive mechanism 313.

Figure 13:
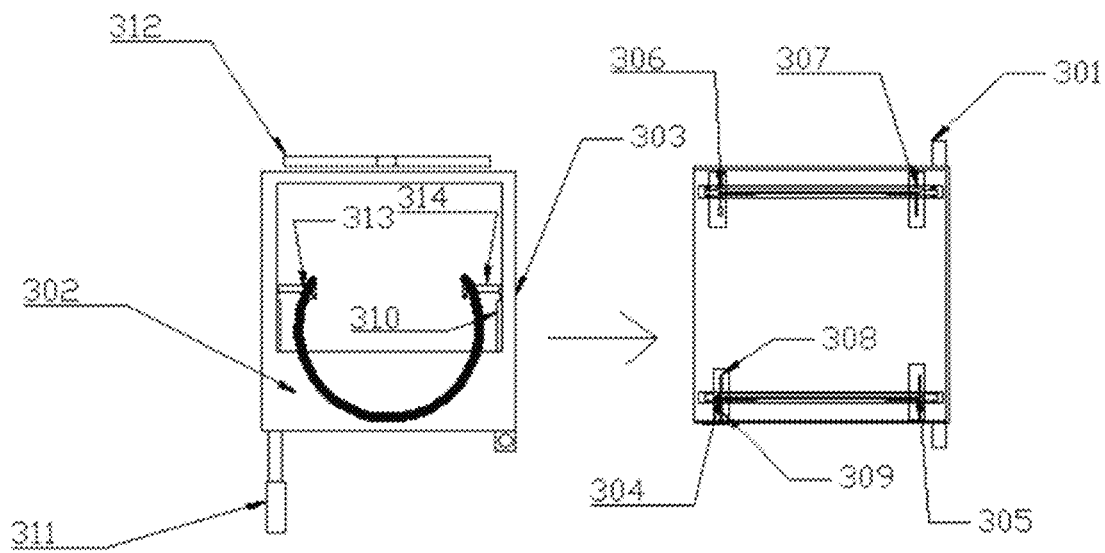
FIG. 13 is a schematic diagram of preparation of baling in horizontal stacking according to an implementation of the present disclosure.

In an implementation of the present disclosure, as shown in FIG. 13, if the bale of reeds is stacked horizontally, the arc-shaped steel wire 314 is placed into the four wire clamps manually. The hydraulic cylinders at two sides of the wire clamps move in opposite directions to clamp the steel wire 314. After the steel wire 314 is clamped, under movement of a wire clamp lifting hydraulic cylinder, the steel wire moves to a bottom of the feed box. Two through grooves are formed in the bottom of the feed box, without affecting the steel wire to move to a position under the bottom of the feed box. The four wire clamps move toward the two sides. Then, the small bales of reeds are stacked horizontally. After the small bales of reeds are stacked completely in sequence, the four wire clamps drive two steel wires to surround the stacked bales of reeds from bottom to top.

As shown in FIG. 14, when the wire clamps move to a position above the bales of reeds, the first wire clamp 304 and the second wire clamp 305 are staggered, and the third wire clamp 306 and the fourth wire clamp 307 are staggered. After staggered, the first wire clamp 304 and the second wire clamp 305 move toward each other, and the third wire clamp 306 and the fourth wire clamp 307 move toward each other. For example, the first wire clamp 304 is raised up appropriately and then tensioned backward, and the second wire clamp 305 is lowered down appropriately and then tensioned forward. For example, through the hydraulic cylinders, the bales of reeds are tensioned. The two steel wires come into use at the same time to increase a binding force for the big bale of reeds.

The present disclosure provides a control method of the reed baling and stacking device, including the following steps:

The reeds are knotted by the knotter 2 into the small bales. The small bales of reeds are stacked by the stacking mechanism 4 to the feed box 3 vertically or horizontally. A plurality of small bales of reeds are knotted into the big bale in the feed box 3.

The control unit 7 controls the drive component of the stacking mechanism 4 to drive the first mechanical clamp 401 and the second mechanical clamp 402 to move along the X-axis direction, the Y-axis direction, and the Z-axis direction, such that the small bales of reeds are clamped by the first mechanical clamp 401 and the second mechanical clamp 402 and stacked to the feed box 3 sequentially.

The control unit 7 controls the wire clamps of the baling mechanism in the feed box 3 to clamp the steel wire 314, and the drive mechanism to drive the wire clamps to knot the small bales of reeds into the big bale.

In an implementation of the present disclosure, in response to the vertical stacking, the control unit 7 controls the stacking mechanism 4 to stack a plurality of small bales of reeds to the feed box 3 vertically.

When a number of small bales of reeds reaches a preset value, the control unit 7 controls the drive mechanism to drive the wire clamps to move up. When the displacement sensor detects that the wire clamp moves up to a preset height, and transmits a signal to the control unit 7, the control unit 7 controls the wire box switch 312-02 to open the wire box 12, such that the steel wire 314 falls off from the wire box 12. When the photoelectric sensor 312-01 senses that the steel wire 314 falls off, and transmits a signal to the control unit 7, the control unit 7 controls the wire box switch 312-02 to close the wire box 12.

The control unit 7 controls the drive mechanism to drive the wire clamps to knot the plurality of small bales of reeds into the big bale.

In an implementation of the present disclosure, the control unit 7 controls the ninth drive mechanism 310, such that the first wire clamp 304 and the second wire clamp 305 opposite to each other have different heights, and clamp the steel wire 314. The control unit 7 controls the third wire clamp 306 and the fourth wire clamp 307 opposite to each other to release the steel wire 314, and the first wire clamp 304 and the second wire clamp 305 to continuously clamp the steel wire 314 and move toward each other, such that the steel wire is intertwined and attached to the big bale of reeds, thereby completing the baling.

As shown in FIG. 14 and FIGS. 15A to 15C, in an implementation of the present disclosure, in response to the horizontal stacking, the control unit 7 controls the stacking mechanism 4 to stack a plurality of small bales of reeds to the feed box 3 horizontally.

When a number of small bales of reeds reaches a preset value, the control unit 7 controls the ninth drive mechanism 310 to drive the wire clamps to move up to a preset position. The first wire clamp 304 and the second wire clamp 305 are connected to a same steel wire 314, and the third wire clamp 306 and the fourth wire clamp 307 are connected to a same steel wire 314.

Figures 15A, 15B, 15C:
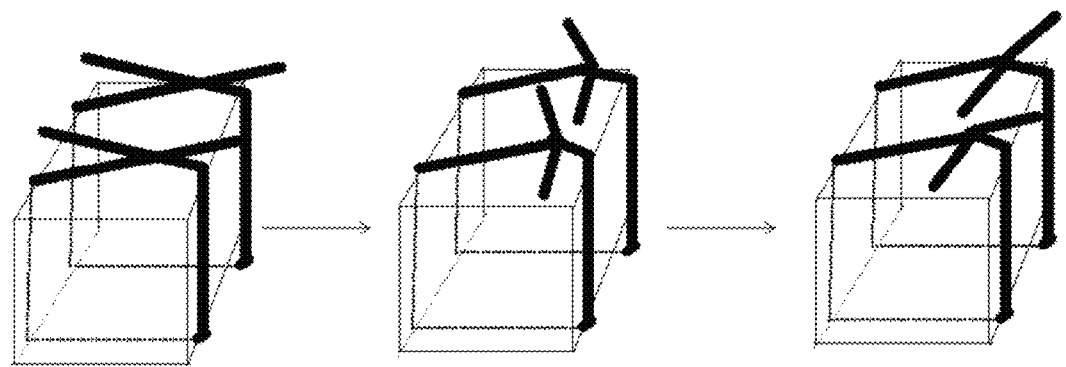

The first wire clamp 304 and the second wire clamp 305 are controlled to stagger in the Y-axis direction. The third wire clamp 306 and the fourth wire clamp 307 are controlled to stagger in the Y-axis direction. The first wire clamp 304 and the second wire clamp 305 are controlled to move toward each other. The third wire clamp 306 and the fourth wire clamp 307 are controlled to move toward each other. The small bales of reeds are tensioned through the steel wire 314. Two steel wires 314 come into use at the same time to increase a binding force for the big bale of reeds, as shown in FIG. 15A. Under an action of the twelfth drive mechanism 315, the first wire clamp 304 and the second wire clamp 305 are controlled to move in opposite directions in the Y-axis direction, and the third wire clamp 306 and the fourth wire clamp 307 are controlled to move in opposite directions in the Y-axis direction, as shown in FIG. 15B. At last, under an action of the eleventh drive mechanism 313, the first wire clamp 304 and the second wire clamp 305 are controlled to move in opposite directions in the X-axis direction to form a loop, and the third wire clamp 306 and the fourth wire clamp 307 are controlled to move in opposite directions in the X-axis direction to form a loop, thereby completing the knotting in the baling of the reeds, as shown in FIG. 15C. The present disclosure uses two mechanical clamps to convey the bales of reeds instead of manual work. By adjusting the hydraulic cylinder at the right position, a distance between the two mechanical clamps is controlled to ensure that the bales of reeds are clamped. The mechanical clamps are adjusted to move in opposite directions to clamp the bales of reeds and convey the bales of reeds to the feed box in the y-axis direction. Then, the hydraulic cylinder at the right position is adjusted to move in a same direction, such that the mechanical clamps clamp the bales of reeds and convey the bales of reeds to the feed box in the x-axis direction.

By controlling the displacement of the hydraulic cylinder, the present disclosure is accurate to vertically stack the bales of reeds to the feed box, makes reasonable use of a space in the feed box, and improves harvesting efficiency. By rotating the hydraulic motor, the present disclosure realizes a process from the vertical stacking to the horizontal stacking for the bales of reeds, and is applied to stacking in feed boxes of different types.

Embodiment 2

The present disclosure provides a harvester, including a header 1, a chassis 6, a driving cab, 5, and the reed baling and stacking device in Embodiment 1. The header 1, the knotter 2, the feed box 3, the stacking mechanism 4, the driving cab 5, and the control unit 7 are provided on the chassis 6. The harvester has the beneficial effects in Embodiment 1, which is not repeated herein.

It should be understood that although this specification is described in accordance with the embodiments, not every embodiment only includes one independent technical solution. This description of the specification is for the sake of clarity only. Those skilled in the art should take the specification as a whole, and the technical solutions in embodiments can also be appropriately combined to form other implementations that can be understood by those skilled in the art.

The series of detailed description listed above are only specific illustration of feasible embodiments of the present disclosure, rather than limiting the claimed scope of the present disclosure. All equivalent embodiments or changes made without departing from the technical spirit of the present disclosure should be included in the claimed scope of the present disclosure.

What is claimed is:

1. A reed baling and stacking device, comprising a knotter, a feed box, a stacking mechanism, and a control unit, wherein
    the stacking mechanism is located between the knotter and the feed box; and the knotter is configured to knot reeds into small bales;
    the control unit is connected to the feed box and the stacking mechanism;
    the stacking mechanism comprises a first mechanical clamp, a second mechanical clamp, and a drive component connected to the control unit;
    the first mechanical clamp and the second mechanical clamp are opposite to each other; the first mechanical clamp and the second mechanical clamp are connected to the drive component; the control unit is configured to control the drive component to drive the first mechanical clamp and the second mechanical clamp to move along an X-axis direction, a Y-axis direction, and a Z-axis direction; and the first mechanical clamp and the second mechanical clamp are configured to clamp and stack the small bales of the reeds to the feed box;
    the feed box comprises a feed box housing; and
    a baling mechanism is provided in the feed box housing; the baling mechanism comprises a wire clamp and a drive mechanism; the wire clamp is configured to clamp steel wires; and the control unit is configured to control the drive mechanism to drive the wire clamp to knot the small bales of the reeds into a big bale.

2. The reed baling and stacking device according to claim 1, wherein the drive component comprises a first drive mechanism, a second drive mechanism, a third drive mechanism, a fourth drive mechanism, a fifth drive mechanism, a sixth drive mechanism,
    a first execution mechanism, and a second execution mechanism that are connected to the control unit;
    the first mechanical clamp is connected to one end of the third drive mechanism; an other end of the third drive mechanism is connected to one end of the first drive mechanism through the first execution mechanism; an other end of the first drive mechanism is connected to one end of the fifth drive mechanism; an other end of the fifth drive mechanism is provided at a position of a harvester chassis close to the knotter; the first drive mechanism is configured to adjust movement of the first mechanical clamp along the X-axis direction; the third drive mechanism is configured to adjust movement of the first mechanical clamp along the Y-axis direction; the fifth drive mechanism is configured to adjust movement of the first mechanical clamp along the Z-axis direction; and the first execution mechanism is configured to drive the third drive mechanism to rotate the first mechanical clamp, such that the first mechanical clamp is vertical or horizontal; and
    the second mechanical clamp is connected to one end of the fourth drive mechanism; an other end of the fourth drive mechanism is connected to one end of the second drive mechanism through the second execution mechanism; an other end of the second drive mechanism is connected to one end of the sixth drive mechanism; an other end of the sixth drive mechanism is provided at the position of the harvester chassis close to the knotter;

the second drive mechanism is configured to adjust movement of the second mechanical clamp along the X-axis direction; the fourth drive mechanism is configured to adjust movement of the second mechanical clamp along the Y-axis direction; the sixth drive mechanism is configured to adjust movement of the second mechanical clamp along the Z-axis direction; and the second execution mechanism is configured to drive the fourth drive mechanism to rotate the second mechanical clamp, such that the second mechanical clamp is vertical or horizontal.

3. The reed baling and stacking device according to claim 1, wherein the wire clamp comprises a first wire clamp, a second wire clamp, a third wire clamp, and a fourth wire clamp;

the first wire clamp, the second wire clamp, the third wire clamp, and the fourth wire clamp are connected to the feed box housing through the drive mechanism; the first wire clamp and the second wire clamp are provided oppositely at one side in the feed box housing; and the third wire clamp and the fourth wire clamp are provided oppositely at an other side in the feed box housing;

the drive mechanism comprises a ninth drive mechanism, an eleventh drive mechanism, and a twelfth drive mechanism; one end of the ninth drive mechanism is connected to the twelfth drive mechanism provided on a bottom plate of the feed box housing, and an other end of the ninth drive mechanism is connected to one end of the eleventh drive mechanism; an other end of the eleventh drive mechanism is connected to the wire clamp; the ninth drive mechanism is configured to drive the eleventh drive mechanism to move up and down, to adjust a height of the wire clamp; the eleventh drive mechanism is configured to drive the wire clamp to move left and right; and the twelfth drive mechanism is configured to drive the ninth drive mechanism to move the wire clamp back and forth; and the ninth drive mechanism and the eleventh drive mechanism are connected to the control unit.

4. The reed baling and stacking device according to claim 1, wherein the wire clamp comprises two wire clamping members, a shaft, a seventh drive mechanism, and an eighth drive mechanism; and the two wire clamping members are connected through the shaft, and arranged in an X shape; the two wire clamping members are respectively connected to the seventh drive mechanism and the eighth drive mechanism; the seventh drive mechanism and the eighth drive mechanism are connected to the control unit; and the seventh drive mechanism and the eighth drive mechanism are configured to respectively drive the two wire clamping members to rotate around the shaft, thereby adjusting an included angle between the two wire clamping members to clamp or release the steel wires.

5. The reed baling and stacking device according to claim 1, wherein the feed box further comprises a rotating shaft and a tenth drive mechanism;

the rotating shaft is provided at a side of the feed box housing close to a feed box door, and one end of the rotating shaft is connected to a harvester frame through a bearing;

the tenth drive mechanism is provided at a side of the feed box housing away from the feed box door, and the tenth drive mechanism is configured to drive one side of the feed box housing to move up and down, such that the feed box housing rotates around the rotating shaft to unload the big bale of the reeds from the feed box door; and the tenth drive mechanism is connected to the control unit.

6. The reed baling and stacking device according to claim 1, wherein a wire box, a displacement sensor, a photoelectric sensor, and a wire box switch are provided on the feed box housing;

the steel wires are provided in the wire box; and the displacement sensor is configured to detect an upward moving height of the wire clamp; when the displacement sensor detects that the wire clamp moves up to a preset height, and transmits a signal to the control unit, the control unit controls the wire box switch to open the wire box, such that the steel wires fall off from the wire box; and when the photoelectric sensor senses that the steel wires fall off, and transmits the signal to the control unit, the control unit controls the wire box switch to close the wire box.

7. A harvester comprising a reed baling and stacking device, the reed baling and stacking device comprising:
a knotter,
a feed box,
a stacking mechanism, and
a control unit,
wherein the stacking mechanism is located between the knotter and the feed box; and
the knotter is configured to knot reeds into small bales;
the control unit is connected to the feed box and the stacking mechanism;
the stacking mechanism comprises a first mechanical clamp, a second mechanical clamp, and a drive component connected to the control unit;
the first mechanical clamp and the second mechanical clamp are opposite to each other;
the first mechanical clamp and the second mechanical clamp are connected to the drive component; the control unit is configured to control the drive component to drive the first mechanical clamp and the second mechanical clamp to move along an X-axis direction, a Y-axis direction, and a Z-axis direction; and the first mechanical clamp and the second mechanical clamp are configured to clamp and stack the small bales of the reeds to the feed box;
the feed box comprises a feed box housing; and
a baling mechanism is provided in the feed box housing; the baling mechanism comprises a wire clamp and a drive mechanism; the wire clamp is configured to clamp steel wires; and the control unit is configured to control the drive mechanism to drive the wire clamp to knot the small bales of the reeds into a big bale.

8. A control method of the reed baling and stacking device according to claim 1, comprising following steps:
knotting, by the knotter, the reeds into the small bales;
controlling, by the control unit, the drive component of the stacking mechanism to drive the first mechanical clamp and the second mechanical clamp to move along the X-axis direction, the Y-axis direction, and the Z-axis direction, such that the small bales of the reeds are clamped by the first mechanical clamp and the second mechanical clamp and stacked to the feed box; and
controlling, by the control unit, the wire clamp of the baling mechanism in the feed box to clamp the steel wires, and the drive mechanism to drive the wire clamp to knot the small bales of the reeds into the big bale.

9. The control method of the reed baling and stacking device according to claim 8, further comprising: in response to vertical stacking, controlling, by the control unit, the stacking mechanism to stack a plurality of the small bales of the reeds to the feed box vertically;

when a number of the small bales of the reeds reaches a preset value, controlling, by the control unit, the drive mechanism to drive the wire clamp to move up; when a displacement sensor detects that the wire clamp moves up to a preset height, and transmits a signal to the control unit, controlling, by the control unit, a wire box switch to open a wire box, such that the steel wires fall off from the wire box; and when a photoelectric sensor senses that the steel wires fall off, and transmits a signal to the control unit, controlling, by the control unit, the wire box switch to close the wire box; and controlling, by the control unit, the drive mechanism to drive the wire clamp to knot the plurality of the small bales of the reeds into the big bale; controlling, by the control unit, a ninth drive mechanism, such that a first wire clamp and a second wire clamp opposite to each other have different heights, and clamp the steel wires; and controlling, by the control unit, a third wire clamp and a fourth wire clamp opposite to each other to release the steel wires, and the first wire clamp and the second wire clamp to continuously clamp the steel wires and move toward each other, such that the steel wires are intertwined and attached to the big bale of the reeds, thereby completing baling.

10. The control method of the reed baling and stacking device according to claim 8, further comprising: in response to horizontal stacking, controlling, by the control unit, the stacking mechanism to stack a plurality of the small bales of the reeds to the feed box horizontally;

When a number of the small bales of the reeds reaches a preset value, controlling, by the control unit, a ninth drive mechanism to drive the wire clamp to move up to a preset position, wherein a first wire clamp and a second wire clamp are connected to a same one of the steel wires, and a third wire clamp and a fourth wire clamp are connected to an other same one of the steel wires; and controlling the first wire clamp and the second wire clamp to stagger in the Y-axis direction, the third wire clamp and the fourth wire clamp to stagger in the Y-axis direction, the first wire clamp and the second wire clamp to move toward each other, and the third wire clamp and the fourth wire clamp to move toward each other, wherein the small bales of the reeds are tensioned through the same one of the steel wires and the other same one of the steel wires, and the same one of the steel wires and the other same one of the steel wires come into use at the same time to increase a binding force for the big bale of the reeds; then, under an action of a twelfth drive mechanism, controlling the first wire clamp and the second wire clamp to move in opposite directions in the Y-axis direction, and the third wire clamp and the fourth wire clamp to move in the opposite directions in the Y-axis direction; and at last, under an action of an eleventh drive mechanism, controlling the first wire clamp and the second wire clamp to move in opposite directions in the X-axis direction to form a loop, and the third wire clamp and the fourth wire clamp to move in the opposite directions in the X-axis direction to form an other loop, thereby completing knotting in baling of the reeds.

\* \* \* \* \*